United States Patent [19]

Stead et al.

[11] Patent Number: 5,240,273
[45] Date of Patent: Aug. 31, 1993

[54] TOW BAR FOR A TRAILER

[75] Inventors: Terence C. Stead; Gary J. C. Stead; Peter Joyce, all of Kent, United Kingdom

[73] Assignee: Evridge Holdings Limited, Dartford, United Kingdom

[21] Appl. No.: 827,123

[22] Filed: Jan. 28, 1992

[30] Foreign Application Priority Data

Jan. 28, 1991 [GB] United Kingdom ............... 9101824

[51] Int. Cl.5 .............................................. B60D 1/50
[52] U.S. Cl. ..................................... 280/489; 280/494
[58] Field of Search ................... 280/483–486, 280/489, 492–494, 638, 656, 789; 267/161, 162

[56] References Cited

U.S. PATENT DOCUMENTS

| | | | |
|---|---|---|---|
| 1,819,393 | 8/1931 | Staley | 280/496 |
| 2,595,474 | 5/1952 | Marvin | 280/489 |
| 2,797,934 | 7/1957 | Helgeson | 280/489 |
| 3,414,294 | 12/1968 | Moulton | 280/489 |
| 3,623,743 | 11/1971 | Rohrer | 280/103 |
| 3,692,331 | 9/1972 | Vegors | 280/489 X |
| 3,700,053 | 10/1972 | Glissendorf | 280/400 X |
| 3,730,542 | 5/1973 | Chadwick | 280/494 |

FOREIGN PATENT DOCUMENTS

| | | |
|---|---|---|
| 0022674 | 1/1981 | European Pat. Off. . |
| 0196935 | 2/1986 | European Pat. Off. . |
| 2454010 | 5/1976 | Fed. Rep. of Germany . |
| 620176 | 4/1927 | France . |
| 2261921 | 7/1975 | France . |
| 2546825 | 12/1984 | France .................... 280/483 |
| 2040847 | 9/1980 | United Kingdom . |

Primary Examiner—Margaret A. Focarino
Assistant Examiner—Victor E. Johnson
Attorney, Agent, or Firm—Bell, Seltzer, Park & Gibson

[57] ABSTRACT

A tow bar for a trailer comprises forward and rear sections which are pivotable relative to one another about a substantially horizontal axis, to reduce the stresses to which the tow bar is subjected when travelling across rough terrain. An axially compressible spring, such as a stack of Belleville springs mounted on a cylindrical shaft, extends between the two tow bar sections to absorb some of the stresses caused by pitching movement of the trailer relative to the towing vehicle.

10 Claims, 5 Drawing Sheets

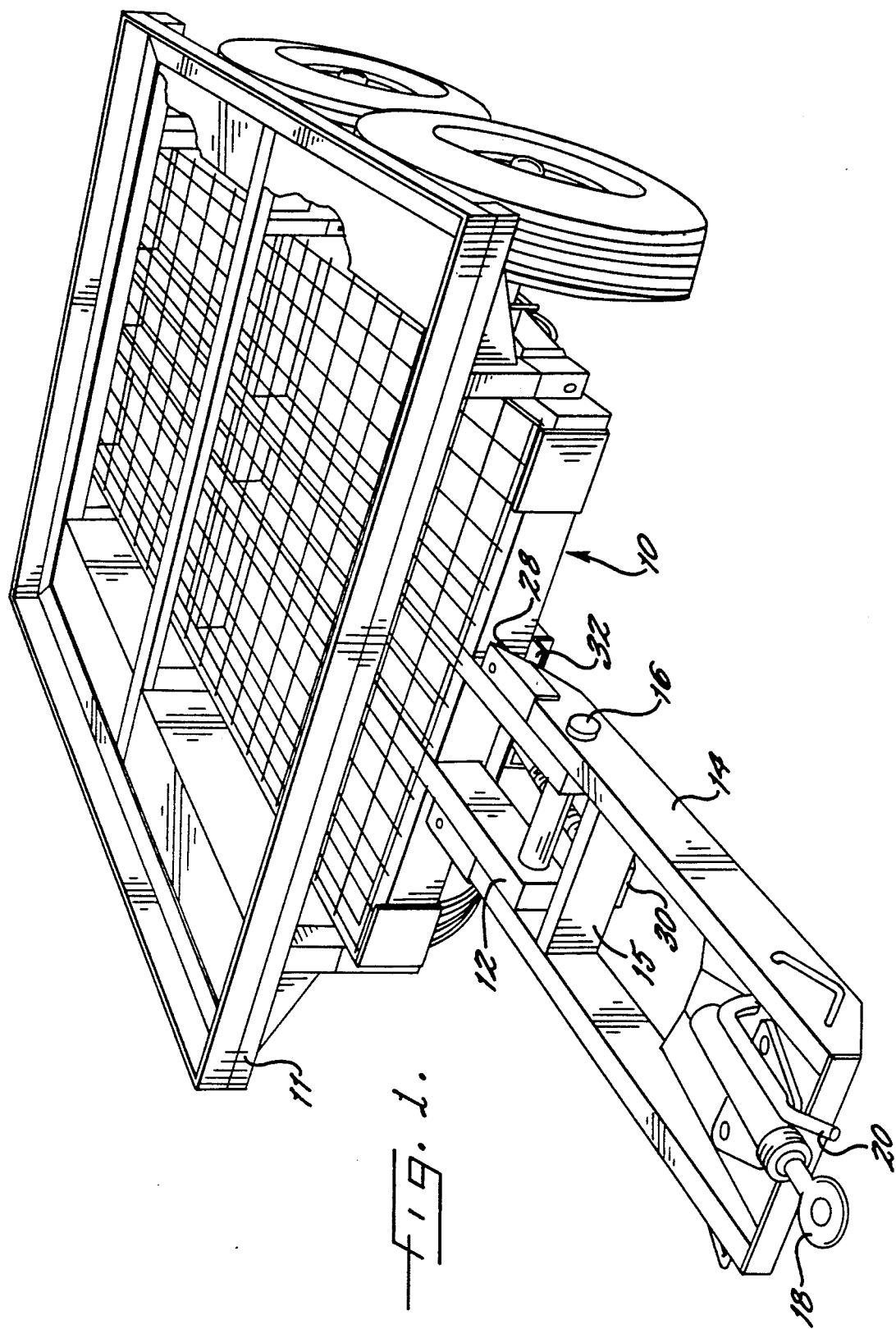

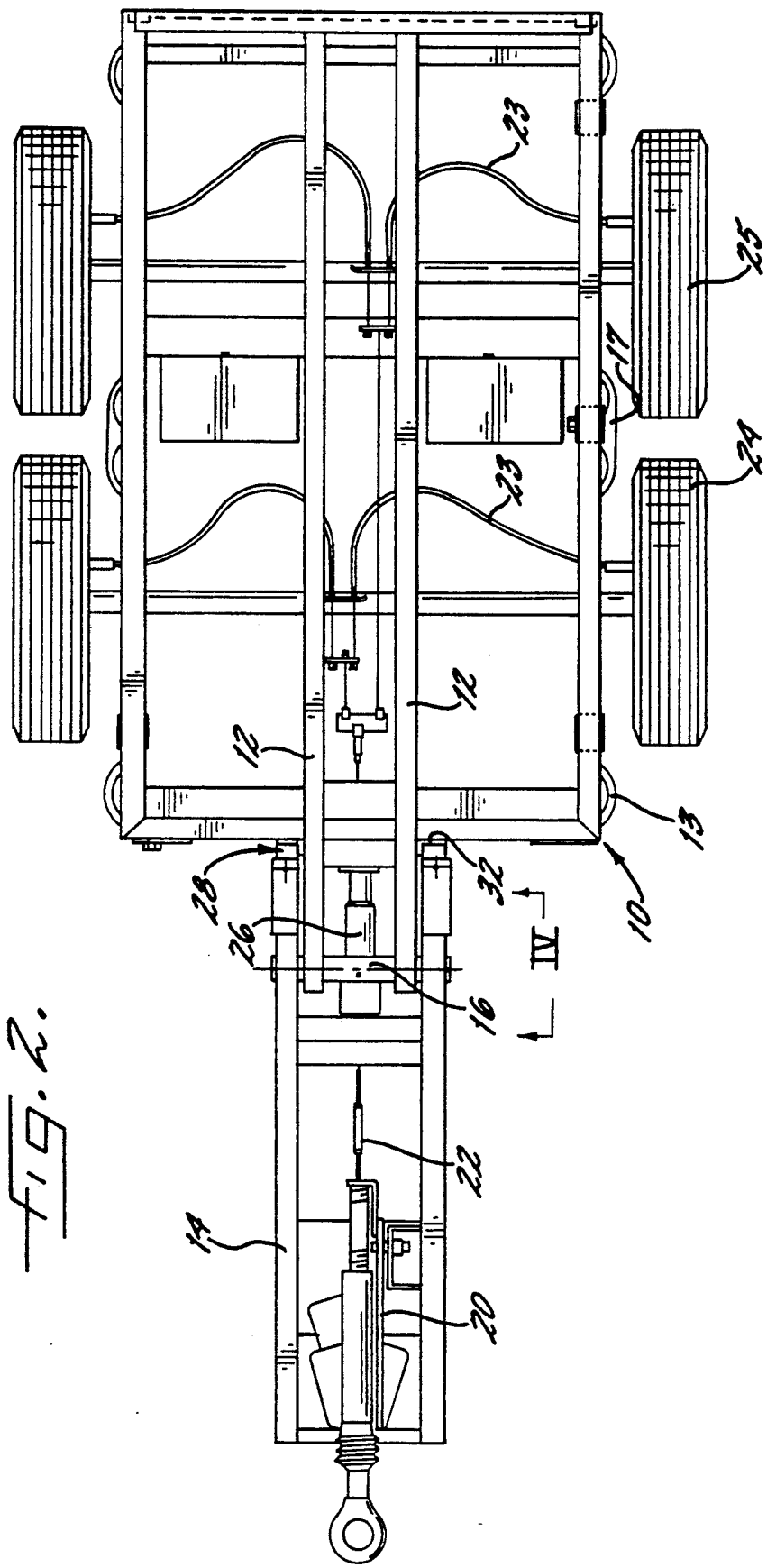

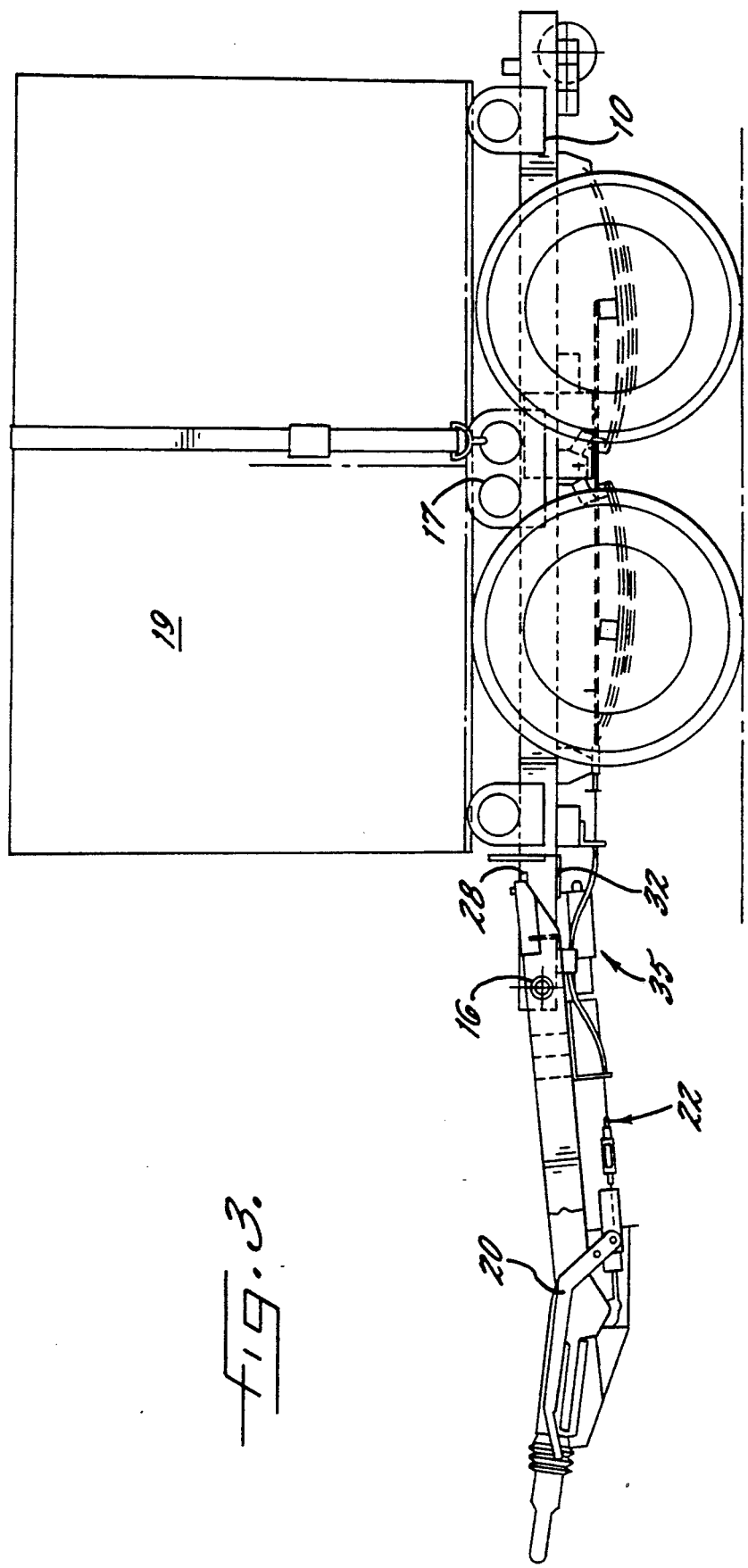

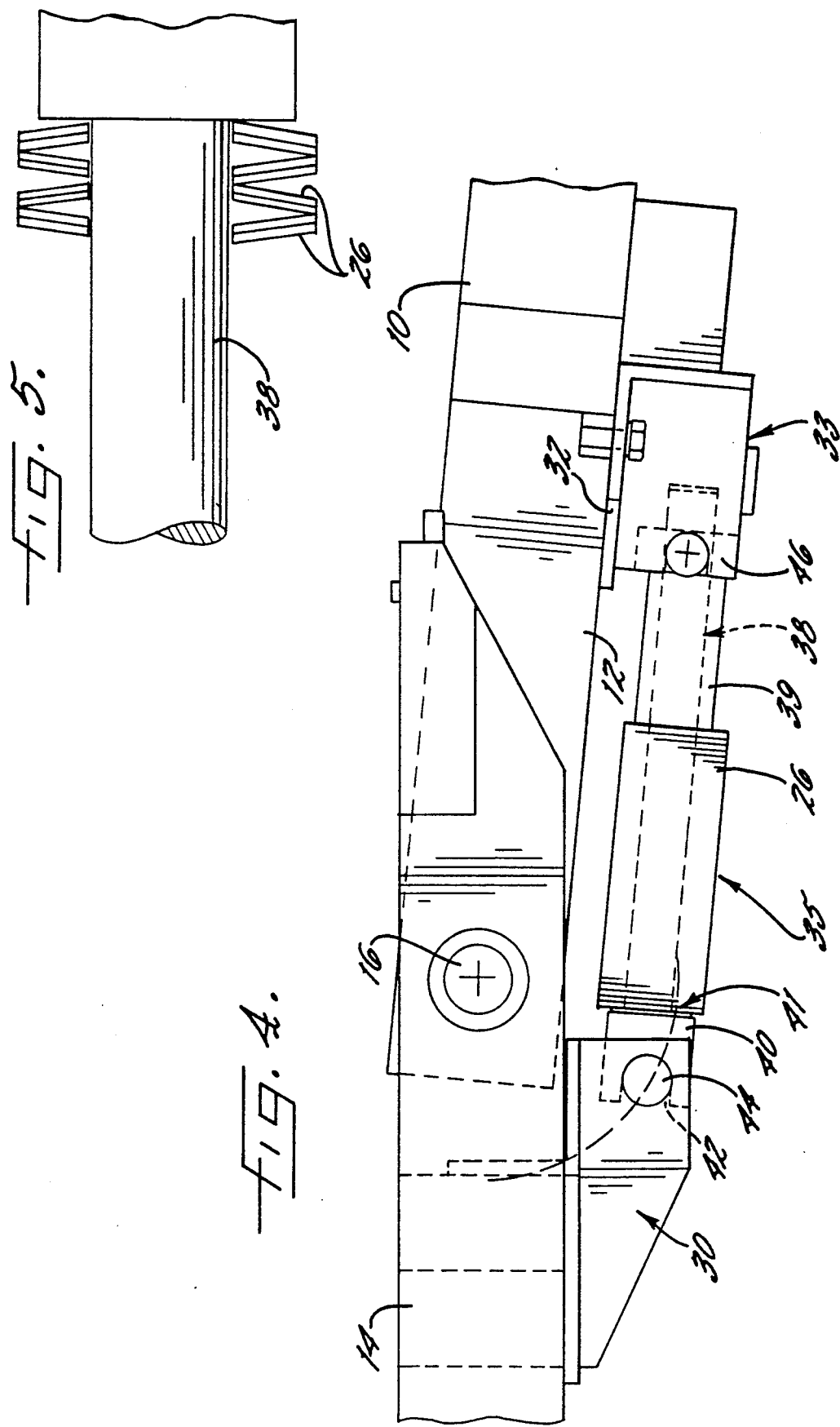

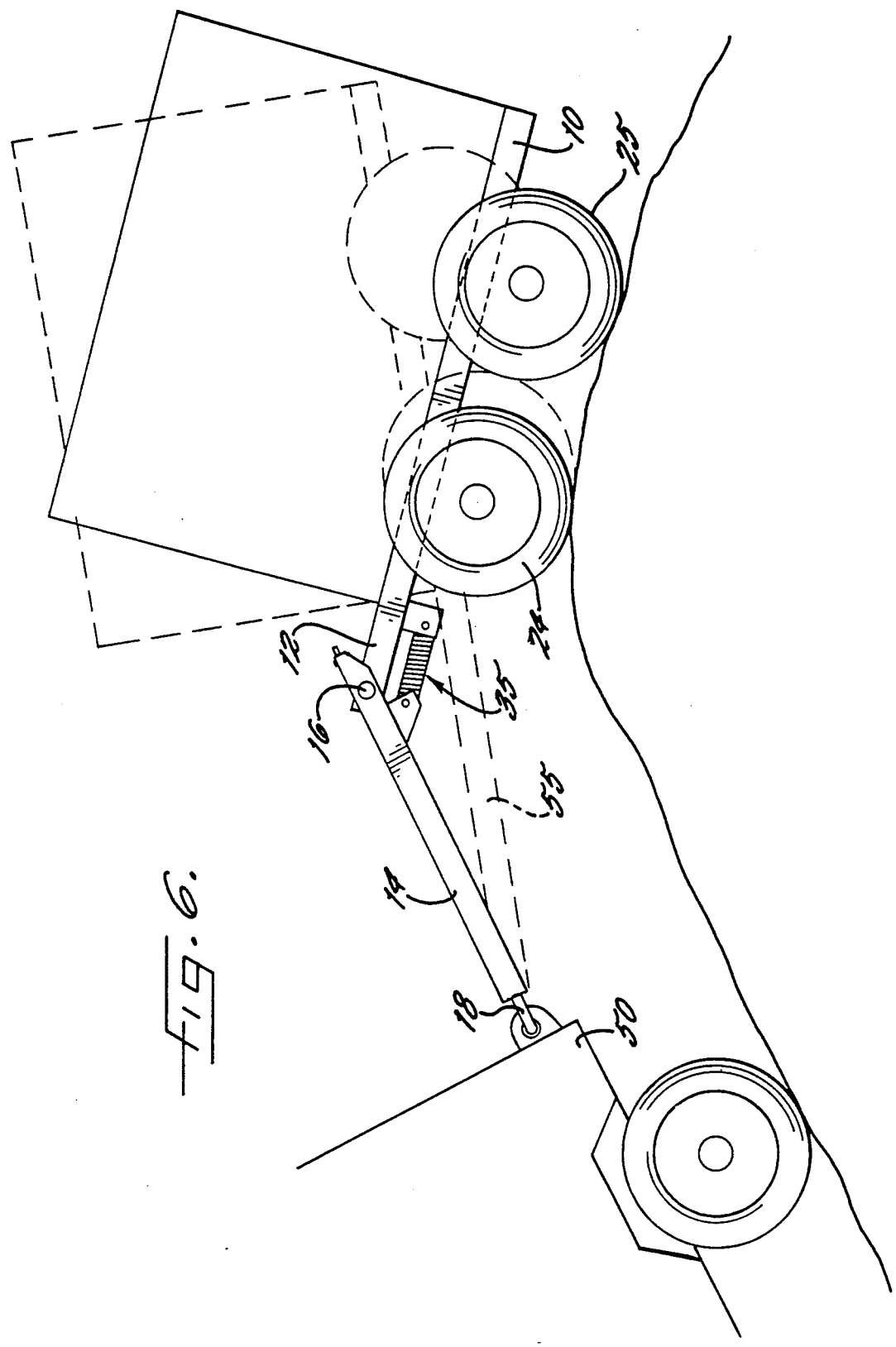

TOW BAR FOR A TRAILER

BACKGROUND OF THE INVENTION

1. Field of the Invention

This invention relates to a trailer, and in particular to a trailer having at least two axles and of a type suitable for carrying heavy loads over rough terrain. The invention is particularly applicable to four-wheeled close-coupled trailers. The four-wheeled configuration has the advantage that the trailer can be free-standing even when part loaded, and also facilitates hitching to a towing vehicle.

2. Description of the Prior Art

Conventional trailers adapted to be towed by motor vehicles are generally secured to the towing vehicle by means of a rigid tow bar, which may be an integral extension of the trailer chassis. The attachment to the towing vehicle, which is generally by means of a metal ring integral with the tow bar and secured by a hook or pin to a bracket on the towing vehicle. This, in combination with the designed length of the tow bar, allows a useful degree of articulation, especially with a tracked towing vehicle such as the M109 SP Howitzer.

When a trailer is being towed over rough cross-country terrain, particularly at speed, rolling and pitching movements of the trailer put considerable stresses on the tow eye unit, causing deformations, cracks and, eventually, fractures.

This occurs because the tow bar cannot move up or down relative to the trailer and the trailer and its load exert a considerable, if transitory, torque on the tow bar.

German Patent Application No. 2,454,010 discloses a tow bar having forward and rear sections, the forward section being pivotable upwards relative to the rear section, about a horizontal axis, to accommodate sudden upward movements of the towing vehicle. The front section has a rearward extension beyond the pivoting axis and above the rear section, and a vertically extending compression spring, positioned between the said rearward extension and the rear tow bar section, opposes the upward pivoting movement.

SUMMARY OF THE INVENTION

It is an object of the present invention to provide a trailer and a tow bar therefor which is of rugged construction and can withstand towing at speed over rough terrain, and which absorbs smoothly the pitching movements of the trailer relative to the towing vehicle, to reduce the stresses to which the trailer tow bar is subjected. This object is achieved in accordance with the invention in a tow bar of the type comprising at least two sections pivotable relative to one another about a substantially horizontal axis, in that an axially compressible spring mechanism, preferably in the form of a stack of Belleville springs, extends between the two sections of the tow bar at a position below and offset from the pivoting axis, to oppose downward movement of the forward section relative to the rear section and to absorb stresses caused by the pivoting movement. The spring bias is preferably adjusted so that when the trailer is not in use it balances the weight of the front tow bar section and holds it in an approximately horizontal position convenient for attachment of a towing vehicle.

The compression spring compressible spring mechanism extends generally in the longitudinal direction of the tow bar, preferably within an angle of about 10° above or below the horizontal.

BRIEF DESCRIPTION OF THE DRAWINGS

Further objects and advantages of the invention will become apparent from the following detailed description when read with reference to the accompanying drawings which illustrate a preferred embodiment thereof.

In the drawings:

FIG. 1 is a perspective view of a trailer incorporating a tow bar in accordance with the present invention;

FIG. 2 is a plan view of the trailer of FIG. 1;

FIG. 3 is a side elevation of the trailer of FIGS. 1 and 2, with a load in place;

FIG. 4 is an enlarged view of a detail of the tow bar, as seen in the direction of arrows IV in FIG. 2;

FIG. 5 is an enlarged detail of the Belleville spring system used in accordance with the invention; and FIG. 6 is a schematic side view of the trailer in use over rough terrain.

DETAILED DESCRIPTION OF THE PREFERRED EMBODIMENT

Referring to FIGS. 1 to 3, a four-wheel trailer has a chassis generally indicated by 10 made up of steel beams of rectangular box section welded together. The chassis comprises a rectangular outer frame and a central pair of rectangular section beams 12, running parallel to one another and extending from the rear end of the chassis to its front end and beyond to form a first part of the tow bar.

In FIG. 1 the trailer is shown with a base frame 11 for supporting a wide load which extends above the wheels. In FIG. 2 the trailer is shown without the base frame but with brackets 13, 17 for attaching a load and in FIG. 3 the trailer is shown with a load 19 in place.

A front section of the tow bar shown in FIG. 1 is formed by two parallel box section beams 14 connected to one another by a section 15 and pivotally attached to the front ends of sections 12 by a horizontal pivot spindle 16.

As shown in FIG. 2 at the front end of the front section of the tow bar is a conventional towing attachment 18 and a handbrake lever 20 which acts, via brake cables 22, 23, to actuate brakes on the front wheels 24 and rear wheels 25 of the trailer.

The two sections of the tow bar are pivotable relative to one another about the horizontal axis formed by the pivot spindle 16, to take up some of the vertical movement, particularly pitching movement, of the trailer relative to the towing vehicle, particularly when travelling over uneven terrain. The pivoting movement of the front section of the tow bar relative to the rear section is preferably limited during use, typically to an angle between 15° upwards and 25° downwards. The upward pivoting movement of the tow bar section is limited by an abutment between a rearwardly projecting flange 28 on each of the beams 14 and a flange 32 on the front of the the chassis.

Downward movement of the front section of the tow bar is opposed by a spring mechanism generally indicated by 35. This is shown in more detail in FIGS. 4 to 6. This spring mechanism can provide the required limitation of downward pivoting, so that special stops are not needed for this purpose. The spring mechanism comprises a stack of Belleville springs 26 arranged in opposing pairs on a cylindrical shaft 38. This shaft extends generally in the longitudinal direction of the tow bar between a bracket 30 on the underside of the front section of the tow bar, in front of the pivoting axis, and a bracket 33, welded to the underside of flange 32, which is bolted to the chassis below the rear section 12 of the tow bar, behind the pivoting axis.

At the front end of the shaft 38 is a block 40 providing a shoulder against which bears the foremost of the Belleville springs 26. On the side opposite the shoulder, the block has a channel 42 of semi-cylindrical cross section which accommodates a cylindrical pin 44 mounted on the bracket 30. The block 40 attached to shaft 38 simply bears against this pin, allowing relative rotational movement between them. The pin can simply lift out of the channel when the assembly is dismantled.

The opposite end of the shaft 38 is slidably engaged in a corresponding cylindrical aperture through a block 46, which is mounted in the bracket 33 for pivotal movement about a horizontal axis. The shaft 38 can slide axially through the block 46. A tubular spacer 39 is provided between the stack of Belleville springs 26 and the block 46.

Since the shaft 38 is offset from the axis of the horizontal pivot pin 16, pivotal movement of the front section 14 of the tow bar relative to the rear section 12 will cause the pin 44, and hence the block 40, to move axially towards or away from the block 46. Downward movement of the front section 14 will move the block 40 towards the block 46, causing compression of the Belleville springs 26 between the block 40 and the spacer 39 as the shaft 38 slides axially through the block 46, which in turn pivots anti-clockwise as shown in FIG. 6. Thus, downward movement of the tow bar is opposed by the stack of Belleville springs.

The spring system 35 is preferably axially preloaded such that the front section 14 of the tow bar assumes an approximately horizontal position relative to the trailer chassis when not attached to a towing vehicle. In this position the shaft 38 is approximately horizontal. As the front tow bar pivots up and down the shaft also pivots, through a smaller angle. When the trailer is standing on level ground, the shaft is preferably not more than about 10° above or below the horizontal at the limits of pivoting of the front tow bar section.

The spring mechanism 35 preferably comprises from 50 to 100 individual Belleville springs, suitably about 80. The number of springs can be varied as necessary, using spacers 39 of different lengths depending on the strength and preloading required to the spring. Other types of spring mechanism may be used, for example a coil spring or a hydraulic spring.

The tow bar construction in accordance with the invention greatly reduces the stresses to which the rigid tow bar sections are subjected by movement of the trailer relative to the towing vehicle when in use. The vertical movements of the trailer relative to the towing vehicle are largely accommodated by the pivotal connection between the front and rear sections of the tow bar.

FIG. 6 shows schematically how the front and rear sections 14, 12 of the tow bar pivot relative to one another when the trailer is towed over rough ground by a towing vehicle 50, allowing all four wheels of the trailer to remain in contact with the ground. In contrast, a trailer with a rigid tow bar 55, shown in broken lines in FIG. 6, cannot pass at any speed over the terrain shown without the rear wheels 25 leaving the ground, putting a considerable stress on the tow bar and on the towing eye 18.

The value of the tow bar assembly of the invention is made singularly apparent when a trailer is towed across severely undulating terrain where the pitch of the undulations may be equal to, or less than, the track length of the towing vehicle, but greater than the distance between the towing eye 18 and the rear wheels 25 of the trailer. Under these conditions the most severe loading on the tow eye unit 18 will be when the tow eye location is at the bottom of a dip and the trailer is being made to breast the retreating hump (see FIG. 6). In such a situation, the cantilever effect of a rigid tow bar such as 55 would also induce a very unstable situation on the trailer and a bending movement in the tow eye unit of something equivalent to 2 to 3 times the cargo load of the trailer, thus inducing shear stresses in the tow eye unit for which it was not designed.

Thanks to the articulation of the tow bar in this situation, the tow eye unit remains subject only to those tensile stresses for which it was designed to cope.

What is claimed is:

1. A tow bar assembly adapted for use with a trailer having at least two axles, said tow bar assembly comprising a forward tow bar section having means thereon for attachment to a towing vehicle and a rear tow bar section, said forward and rear tow bar sections being longitudinally aligned and pivotally interconnected for pivotable movement relative to one another about a transverse axis, and said assembly further comprising an axially compressible spring mechanism extending and acting longitudinally of said tow bar sections, said spring mechanism comprising a stack of Belleville springs slidably mounted on an elongate shaft, with one end of said shaft passing slidably through a block which is mounted to pivot about a further transverse axis which is fixed relative to one of said forward and rear tow bar sections, and with the other end of said shaft including a channel which rotatably engages a pin which is fixed relative to the other of said forward and rear tow bar sections, said spring mechanism extending below and offset from said first mentioned transverse axis to oppose downward pivoting of the forward tow bar section relative to the rear tow bar section when in use, and to absorb bending stress exerted on said tow bar.

2. The tow bar assembly as claimed in claim 1 wherein said forward tow bar section comprises a pair of parallel beams rigidly connected together in a spaced relationship.

3. The tow bar assembly as claimed in claim 1 wherein means are provided to limit the relative pivotal movement between said forward and rear tow bar sections to about 15° above the orientation wherein said sections are aligned and about 25° below such orientation.

4. A trailer adapted to be towed by a towing vehicle and comprising a chassis, at least one axle mounted to said chassis, a pair of wheel assemblies mounted to said one axle for supporting the trailer for movement along the ground surface, and a tow bar assembly mounted to said chassis, the improvement wherein said tow bar assembly comprises a forward tow bar section having means thereon for attachment to a towing vehicle and a rear tow bar section, said forward and rear tow bar sections being longitudinally aligned and pivotally interconnected for pivotable movement relative to one another about a substantially horizontal axis, and said assembly further comprising an axially compressible spring mechanism extending and acting longitudinally of said tow bar sections, said spring mechanism comprising a stack of Belleville springs slidably mounted on an elongate shaft, with one end of said shaft passing slidably through a block which is mounted to pivot about a further horizontal axis which is fixed relative to one of said forward and rear tow bar sections, and with the other end of said shaft including a channel which rotatably engages a pin which is fixed relative to the other of said forward and rear tow bar sections, said spring mechanism extending below and offset from said first mentioned horizontal axis to oppose downward pivoting of the forward tow bar section relative to the rear tow bar section when in use, and to absorb bending stress exerted on said tow bar.

5. The trailer as defined in claim 4 wherein two longitudinally spaced apart axles are mounted to said chassis, with a pair of wheel assemblies being mounted to each of said axles.

6. The trailer as defined in claim 5 wherein said chassis includes at least one longitudinally extending beam, and wherein said rear tow bar section comprises an integral extension of said one beam.

7. The trailer as defined in claim 5 wherein said chassis includes a pair of longitudinally extending beams which are parallel to and laterally spaced apart from each other and wherein said rear tow bar section comprises integral extensions of said pair of beams.

8. The trailer as defined in claim 7 wherein said forward tow bar section comprises a pair of parallel beams which are rigidly connected together in a laterally spaced relationship.

9. The trailer as defined in claim 4 wherein said elongate shaft of said spring mechanism extends along an axis which extends not more than 10° above or below the horizontal.

10. The trailer as defined in claim 4 wherein said spring mechanism is axially preloaded so as to bias said forward tow bar section into a substantially horizontal position when not attached to a towing vehicle.

* * * * *